W. BROWNING.
CORN PLANTER.
APPLICATION FILED SEPT. 5, 1914.

1,157,501.

Patented Oct. 19, 1915.
2 SHEETS—SHEET 1.

WITNESSES

INVENTOR
WOODSON BROWNING,
BY
ATTORNEYS

W. BROWNING.
CORN PLANTER.
APPLICATION FILED SEPT. 5, 1914.

1,157,501.

Patented Oct. 19, 1915.
2 SHEETS—SHEET 2.

WITNESSES
E. H. Callaghan
C. E. Trainor

INVENTOR
WOODSON BROWNING,
BY Munn & Co.
ATTORNEYS

UNITED STATES PATENT OFFICE.

WOODSON BROWNING, OF OKLAHOMA, OKLAHOMA.

CORN-PLANTER.

1,157,501.   Specification of Letters Patent.   Patented Oct. 19, 1915.

Application filed September 5, 1914. Serial No. 860,394.

*To all whom it may concern:*

Be it known that I, WOODSON BROWNING, a citizen of the United States, and a resident of Oklahoma city, in the county of Oklahoma and State of Oklahoma, have invented a new and useful Improvement in Corn-Planters, of which the following is a specification.

My invention is an improvement in corn planters, and has for its object to provide a planter of the check rower type, wherein the dropping mechanism is actuated from the wheels of the machine to drop a series of grains at regular intervals, and wherein other mechanism is provided for marking each hill planted.

Figure 1:
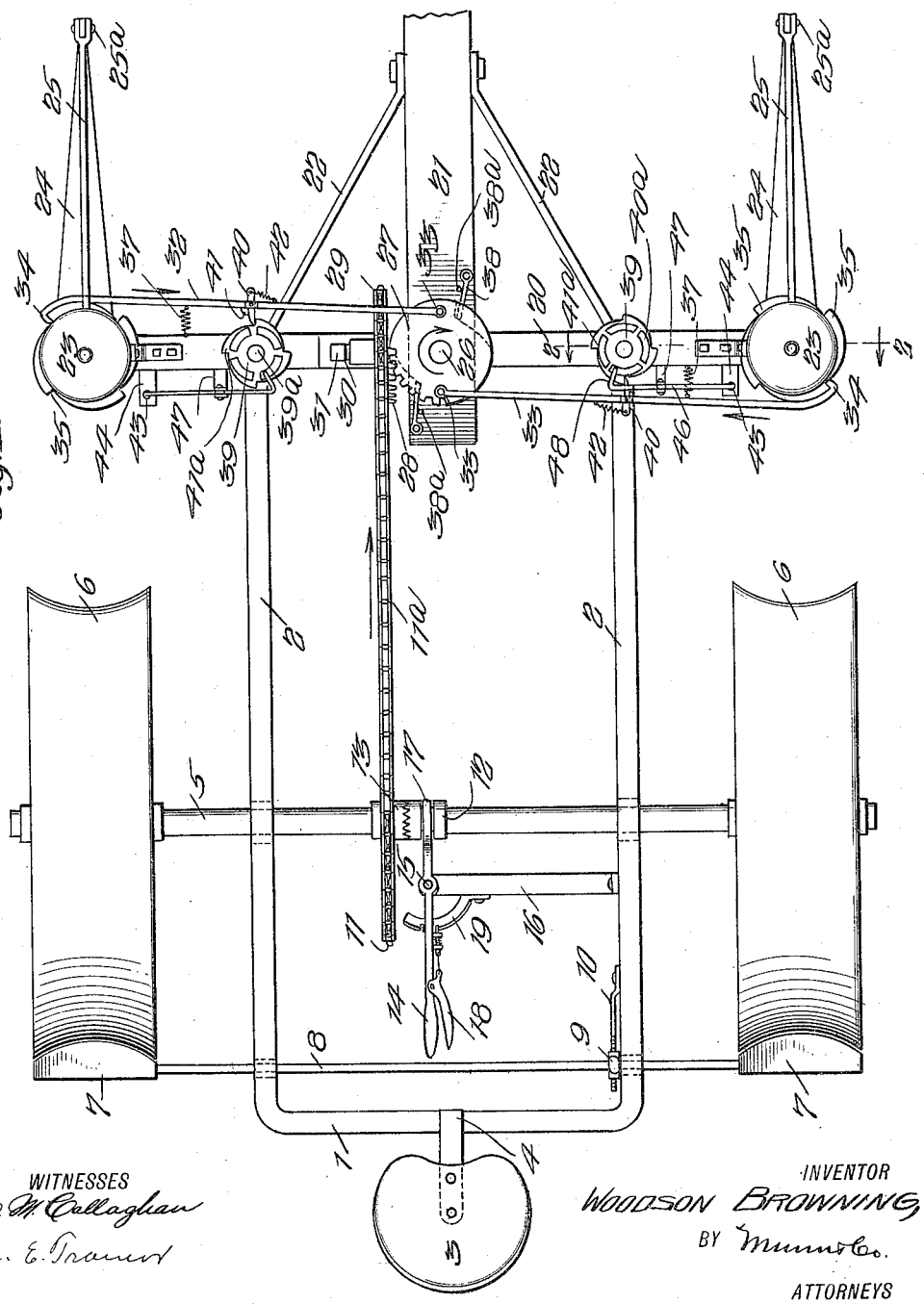
Figure 2:
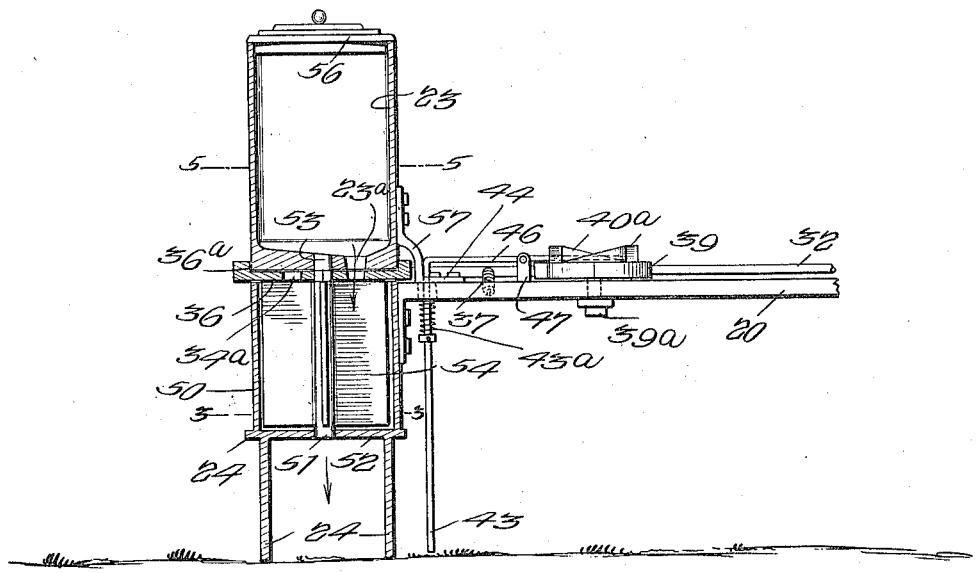
Figure 3:
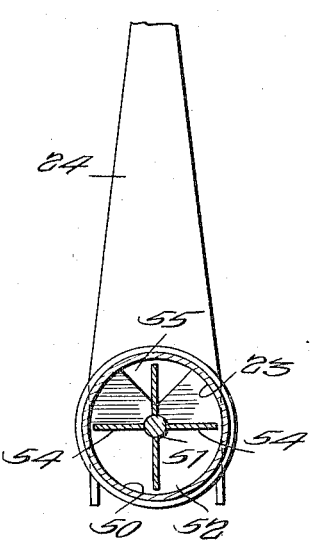
Figure 4:
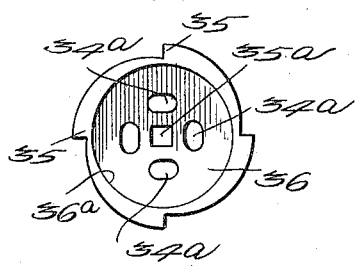
Figure 5:
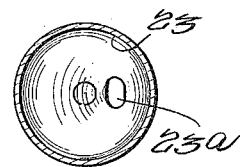

In the drawings:—Figure 1 is a top plan view of the improved planter, Fig. 2 is a section on the line 2—2 of Fig. 1, looking in the direction of the arrows adjacent to the line, Fig. 3 is a section on the line 3—3 of Fig. 2, Fig. 4 is a top plan view of the dropping plate, and Fig. 5 is a section on the line 5—5 of Fig. 3.

The present embodiment of the invention comprises a main frame, consisting of a yoke-shaped member, composed of a body 1 and arms 2, extending laterally from the body and approximately parallel with each other, and a seat 3 is connected to the body 1 by means of a spring plate 4. An axle 5 is journaled transversely of the arms 2, intermediate the ends thereof, and wheels 6 are secured to the ends of the axle, the wheels having the usual concave peripheries as shown. Cleaning blades 7 are arranged adjacent to the wheels in rear thereof, the blades being connected to the ends of a shaft 8, which is journaled transversely of the arms 2 near the body 1. The free edges of the blades are shaped to fit the concave peripheries of the wheels, and the said blades may be brought into and out of operative position by means of a lever 9, secured to the shaft at one of the arms 2, and having latch mechanism coöperating with a toothed sector 10, secured to the said arm. When the lever is released from the sector, the shaft may be oscillated to bring the blades 7 into the position of Fig. 1, in which position they will clean the dirt that may adhere to the wheels or they may be brought into inoperative position. A sprocket wheel 11 is journaled loosely on the axle between the arms 2, and the hub 13 of the said sprocket wheel carries one section of a clutch. The other section 12 of the clutch is splined or feathered to the axle, and the said section may be moved toward and from the hub of the sprocket wheel by means of the lever 14. The said lever is pivoted at 15 intermediate its ends to a bracket arm 16, extending inwardly from one of the arms 2, and the lever is forked at the end adjacent to the section 12 of the clutch, the arms 17 of the fork engaging an annular groove in the said section. The lever is provided with the usual latch mechanism 18, which coöperates with a toothed sector 19, secured to the bracket arm 16. It will be obvious that when the lever is released from the sector, the movable section 12 of the clutch may be moved toward and from the fixed section to couple the sprocket wheel to the axle or to disconnect it therefrom.

A plate 20 is arranged transversely of the frame at the front ends of the arms 2, and the said plate extends beyond the arms at each end of the plate. A tongue 21 is connected to the plate at the center thereof, and the said tongue is braced against the plate at each side by means of inclined braces 22. Each of the said braces is secured to the tongue at one end, and the plate at the other, the connection with the plate being at the connection of the plate with the arms 2.

The usual seed boxes or containers 23 are arranged at the ends of the plate 20, and a runner or furrow opener 24 is arranged below each of the seed boxes. The runners are of usual construction, being of considerable width at their rear ends, and pointed at their front ends, and having their front ends turned upward in the usual manner, and the front end of each runner is connected to the adjacent seed box by means of an inclined brace rod 25. The front end of each brace rod is forked and the arms of the fork are pivoted to the runner as indicated at 25ª, and the other end of each rod is connected to the seed box in the usual manner.

A shaft 26 is journaled in vertical position at approximately the center of the plate 20, and a disk 27 is secured to the shaft. The disk is provided with a series of teeth, the said series extending over approximately one-fourth the periphery of the disk, and the teeth mesh with other teeth 28 on the adjacent face of a sprocket wheel 29, which is secured to a stub shaft 30 supported by the plate 20 in bearings 31 on the said plate. A pair of links 32 is connected with the disk, each link being pivoted to the disk at one end of the link as indicated at 33, and each link is provided at its outer end with a catch or hook 34. The links are connected to the disk 27 at diametrically opposite points, and each link extends outward toward the adjacent seed box 23. Each hook or catch is adapted to engage teeth 35 on the periphery of a dropping plate 36, each of the said plates being arranged below the adjacent seed box. It will be noted from an inspection of Fig. 4 that each of the dropping plates has a recess $36^a$ on its upper face, in which is seated the lower end of the adjacent seed box. Each disk is also provided with a central opening $35^a$ of polygonal outline, and with an annular series of dropping openings $34^a$ between the opening $35^a$ and the periphery of the recess 36.

Each seed box has an opening $23^a$ in its bottom, and the said opening is at the lowest point of the bottom so that if there is any grain in the said box it will move to the opening $23^a$. The opening $23^a$ of each seed box is so arranged with respect to the seed box that the openings $34^a$ of the dropping plate 36 will register in succession with the said opening $23^a$ when the dropping plate is rotated in a manner to be presently described.

The hook or catch 34 of each link 32 is as before stated, arranged to engage the teeth 35 of the adjacent seed plate in succession, and a coil spring 37 is arranged between each link and the adjacent edge of the plate 20 to hold the link in such position that the catch or hook 34 will engage the teeth. The sprocket wheel 29 is rotated from the sprocket wheel 11, by means of a sprocket chain $11^a$, so that when the sprocket wheel 11 is rotated the sprocket wheel 29 will be rotated therewith. The teeth 28 extend over an arc of 90° on the face of the sprocket wheel 29, and it will be evident that when the said teeth are in engagement with the teeth of the disk 27 the disk 27 will be moved with the disk 29 until the teeth 28 disengage from the teeth of the disk. The arrangement is such that the disk 27 will be given a quarter turn at each complete rotation of the sprocket wheel 29. Plate springs 38 are provided for returning the disk 27 and the shaft 26 to original position after the said disk has been partially rotated by the sprocket wheel 29, and each of the said springs is pivoted to the upper face of the tongue. Stops $38^a$ are arranged on the tongue for engagement by the springs to limit their movement in one direction. As soon as the teeth 28 release the teeth of the disk 27, these springs 38 will immediately return the disk 27 and the shaft 26 to the normal position shown in Fig. 1. The disk 27 is rotated just sufficient to move each dropping plate a distance of one tooth. Each of the said plates is provided with four teeth, and at each movement of the disk 26, both dropping plates are given a quarter turn. The teeth are so arranged with respect to the openings 34 and with respect to the openings $23^a$ that the dropping plate will stop always with the opening $34^a$ out of register with the opening $23^a$ of the adjacent seed box.

A cam wheel 39 is journaled on the plate 20 between each seed box and the shaft 26, the said cam wheels being journaled on bolts $39^a$, connected to the plate. Each cam wheel is provided with four cams on its upper face, and with four cams or teeth on its peripheral surface. The cams $40^a$ on the upper faces of the cam wheels are similarly arranged, and the teeth or cams $41^a$ on the periphery of the cam wheels are designed for engagement by pawls 40 pivoted to the links 32. Each of the said pawls 40 is pivoted to the adjacent link 32 intermediate the ends of the pawl, and one end of the pawl is in position to engage the teeth $41^a$ of the adjacent cam wheel. A stop 41 is arranged on the link adjacent to each pawl to limit the outward swinging of the end of the pawl adjacent to the cam wheel, and a coil spring 42 is arranged between the outer end of each pawl and the link, the spring acting normally to hold the pawl in engagement with the stop 41. The spring 37 of each link also acts to hold the link with the catch or hook 34 in engagement with the teeth 35, and with the pawl 40 in engagement with the teeth $41^a$ of the cam wheel 39. Whenever the disk 27 is oscillated a quarter turn as above described, each seed plate 36 will be advanced a quarter turn, and the cam wheel 39 will also be advanced a quarter turn.

A casing 50 is arranged below each seed plate, and between the same and the adjacent runner 24, and a shaft 51 is journaled in each casing at the axis thereof. The lower end of each shaft is journaled in the top 52 of the runner, which is also the bottom of the casing 50, and the upper end of the shaft is squared as indicated at 53, and is received within the square opening $35^a$ of the seed plate. Each shaft 51 is provided with four radial longitudinally extending vanes 54, the said vanes extending from the under face of the seed plate to the upper face of the top 52 of the runner, and from the shaft to near the periphery of the casing. The top 52 of the runner above mentioned, is provided with an opening 55 at the front of the casing 50, for permitting the seed to pass from the casing 50 into the runner.

A plunger 43 is arranged adjacent to each seed box for indicating the position of the planted hill. The plungers are mounted for vertical sliding movement in bracket arms 44, extending rearwardly from the plate 20, and each plunger is an integral extension from a lever 46. Each lever 46 is pivoted between a pair of bearings on an angular bracket 47 supported by the plates 20, and each lever is provided at its inner end with a laterally extending lug 48 in position to be engaged by the cams 40$^a$ on the cam wheel 39. Each plunger is normally forced upward by a spring 45 and downward by the cams 40$^a$.

In operation, the machine is drawn through the field in the usual manner, and when it is desired to plant grain the sprocket wheel 11 is connected to the shaft or axle 5. As the sprocket wheel 29 is rotated continuously the disk 27 will be moved a quarter turn forward and backward at each complete rotation of the sprocket wheel 29. At each movement of the disk 27 the links 32 will be moved longitudinally inward in a direction to advance the dropping plates 33. As each opening of each dropping plate moves beneath the opening 23$^a$ a charge of seed will pass through the registering openings downward between the vanes or blades 54 on the shaft 51, and will come to rest upon the partition plates 52, which separate the casing 50 from the interior of the runner. It will be understood that a charge of seed is dropped through the opening 55 into the furrow at each oscillation of the disk 57. Each movement of the links 52 will also impart a quarter turn to the cam wheel 39 and will cause the said wheel to drive the plunger 43 downward to mark the position of the hill by an opening adjacent thereto.

Each seed box is provided with a cover 56 for convenience in inserting the grain, and each of the said boxes is supported by an angle bracket 57 from the adjacent end of the plate 20. The casings 50 are secured to angular lugs 58 at the ends of the plate 20, and the dropping plate is supported by the upper end of the said casing.

I claim:—

1. In a corn planter, the combination with the wheel supported frame, of a disk journaled on the frame to rotate on a vertical axis, a driving connection between the disk and the wheels for moving the said disk a quarter turn for each complete rotation of the wheels, said connection being releasable at the end of each partial movement of the disk, a cam wheel journaled at each side of the disk, a marker operated by each cam wheel, and means in connection with each cam wheel and the adjacent link for imparting a quarter turn to the cam wheel when the disk is moved by the wheels.

2. In a corn planter, the combination with the seed box and the runner, of a shaft journaled in vertical position between the runner and the seed box, said shaft having spaced radial vanes, an inclosing casing for the shaft, between the seed box and the runner, a seed plate connected to the shaft to rotate therewith and arranged between the seed box and the casing and having an annular series of dropping openings, the runner having an opening at the front of the casing, and the seed box having a single opening with which the openings of the seed plate are adapted to register in succession, each opening of the seed plate being between adjacent vanes.

3. In a corn planter, a wheel supported frame, a seed dropping mechanism at each side of the frame including a seed dropping plate journaled on a vertical axis, each of the plates having teeth on its periphery spaced at angles of 90° with respect to each other, a disk journaled on the frame between the seed plates, a driving connection between the disk and the wheel of the frame for moving the said disk a quarter turn for each complete rotation of the wheel and releasable at the end of each partial movement of the disk, and a link for each seed plate pivoted to the disk at one end and having a catch for engaging the teeth of the adjacent plate at the other.

4. In a corn planter, a wheel supported frame, seed dropping mechanism at each side of the frame, means for operating said mechanism and including a disk journaled between the said mechanisms, a connection between the wheels and the disks for imparting a quarter turn to the disk at predetermined intervals, a plunger movable vertically adjacent to each seed box for marking the ground, a lever pivoted to each plunger at the upper end thereof, a spring normally pressing each plunger upwardly, a cam for engaging the other end of each lever for depressing the plunger, and a connection between the cam and the disk for moving the cam when the disk is moved.

5. In a corn planter, the combination with the wheel supported frame and the seed dropping mechanism at the opposite sides thereof, of a vertically movable plunger adjacent to each of the seed mechanisms, a spring normally holding each plunger lifted, a cam for depressing the plunger, and a common means connected to the wheels of the frame for operating the cams and the feeding mechanisms.

WOODSON BROWNING.

Witnesses:
 E. E. LASH,
 J. W. QUILETY.

Copies of this patent may be obtained for five cents each, by addressing the "Commissioner of Patents, Washington, D. C."